US008635192B2

(12) United States Patent
Klassen et al.

(10) Patent No.: US 8,635,192 B2
(45) Date of Patent: Jan. 21, 2014

(54) METHOD OF AUTOMATICALLY GEOTAGGING DATA

(75) Inventors: Gerhard Dietrich Klassen, Waterloo (CA); Matthew Bells, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 604 days.

(21) Appl. No.: 12/038,927

(22) Filed: Feb. 28, 2008

(65) Prior Publication Data

US 2009/0222482 A1    Sep. 3, 2009

(51) Int. Cl.
*G06F 17/30*    (2006.01)

(52) U.S. Cl.
USPC ............ 707/673; 707/661; 707/706; 707/711

(58) Field of Classification Search
USPC .................................. 707/673, 661, 711, 706
See application file for complete search history.

(56) References Cited

U.S. PATENT DOCUMENTS

| | | | |
|---|---|---|---|
| 6,995,792 | B1 | 2/2006 | Ogura |
| 7,970,418 | B2* | 6/2011 | Schmidt et al. ............ 455/456.5 |
| 2006/0007315 | A1 | 1/2006 | Singh |
| 2007/0110316 | A1* | 5/2007 | Ohashi .......................... 382/195 |
| 2008/0133697 | A1* | 6/2008 | Stewart et al. ................ 709/217 |
| 2008/0268876 | A1* | 10/2008 | Gelfand et al. ............... 455/457 |
| 2009/0136226 | A1* | 5/2009 | Wu et al. ....................... 396/321 |
| 2009/0204899 | A1* | 8/2009 | Bennett ......................... 715/730 |

FOREIGN PATENT DOCUMENTS

| | | |
|---|---|---|
| EP | 0 959 418 A2 | 11/1999 |
| EP | 1720030 | 11/2006 |
| EP | 1 879 373 A1 | 1/2008 |
| JP | 2001166366 A | 6/2001 |
| WO | 2004059966 A1 | 7/2004 |
| WO | 2005001714 | 1/2005 |
| WO | 2005001714 A1 | 1/2005 |

OTHER PUBLICATIONS

Juhong Liu et al. "Extracting Semantic Location from Outdoor Positioning System" Mobile Data Management, 2006. MDM 2006. 7th International Confernece; May 10, 2006, XP 010917947.
Juhong Liu et al. "Extracting Semantic Location from Outdoor Positioning System" Mobile Data Management, 2006, MDM 2006, 7th International Conference; May 10, 2006, XP 010917947.
European Search Report for EP Application No. 08152102 mailed Jun. 25, 2008.

(Continued)

*Primary Examiner* — Baoquoc N To
(74) *Attorney, Agent, or Firm* — Gowling Lafleur Henderson LLP

(57) ABSTRACT

A handheld electronic device, such as a GPS-enabled wireless communications device with an embedded camera, automatically geotags a set of data, such as a digital photo, video, notes, or a blog, with a textual plain-language description of the current location. When the data is generated, the current location of the device is determined, e.g. using a GPS receiver. A textual plain-language description of the current location is then generated, e.g. by reverse geocoding the GPS position coordinates or by correlating the current time with a calendar event from which language descriptive of the event can be extracted. This textual plain-language description is automatically generated and written into a tag or metadata file associated with the photo or other set of data. By automatically geotagging data with textual plain-language descriptions that go beyond mere coordinates of latitude and longitude, data can be searched and managed more efficiently.

15 Claims, 10 Drawing Sheets

(56) References Cited

OTHER PUBLICATIONS

European Search Report for EP Application No. 08150732.9 mailed Oct. 9, 2008.
Kentaro Toyama et al—"Geographical Location Tags on Digital Images" Nov. 2, 2033.
EPO Exam Report dated Sep. 15, 2011 for corresponding EP application 08 152 102.2-1228.
Kentaro Toyama et al "Georgraphic Location Tags on Digital Images" Nov. 2003.
Canadian office action from corresponding Canadian application No. 2 653 838 dated May 31, 2012.

* cited by examiner

| Street Address | Geocoordinates Latitude / Longitude |
|---|---|
| ... | ... |
| 117 Main Street, Ottawa, ON | 45 deg 54.309 min N / 77 deg 30.983 min W |
| 119 Main Street, Ottawa, ON | 45 deg 54.310 min N / 77 deg 30.984 min W |
| 121 Main Street, Ottawa, ON | 45 deg 54.312 min N / 77 deg 30.985 min W |
| 123 Main Street, Ottawa, ON | 45 deg 54.314 min N / 77 deg 30.987 min W |
| 125 Main Street, Ottawa, ON | 45 deg 54.316 min N / 77 deg 30.988 min W |
| 127 Main Street, Ottawa, ON | 45 deg 54.318 min N / 77 deg 30.990 min W |
| 129 Main Street, Ottawa, ON | 45 deg 54.321 min N / 77 deg 30.991 min W |
| ... | |

*FIG. 3*

| Tag | Value |
| --- | --- |
| Manufacturer | ABC Digital Corp. |
| Model | Quick Pix 1.0 |
| Date and Time | 2007:11:19 17:30:05 |
| Exif Version | 2.1 |
| Exposure Time | 1/659 sec. |
| F Number | f/4.0 |
| Compression | JPEG |
| X-Resolution | 72.00 |
| Y-Resolution | 72.00 |
| Focal Length | 20.1 mm |
| PixelXDimension | 2240 |
| PixelYDimension | 1680 |
| Latitude | 45 deg 54.314 min N |
| Longitude | 77 deg 30.987 min W |
| Textual Plain-Language Description | "123 Main Street, Ottawa, Ontario, Canada" |

FIG. 8

| Tag | Value |
|---|---|
| Manufacturer | ABC Digital Corp. |
| Model | Quick Pix 1.0 |
| Date and Time | 2007:11:19 17:30:05 |
| Exif Version | 2.1 |
| Exposure Time | 1/659 sec. |
| F Number | f/4.0 |
| Compression | JPEG |
| X-Resolution | 72.00 |
| Y-Resolution | 72.00 |
| Focal Length | 20.1 mm |
| PixelXDimension | 2240 |
| PixelYDimension | 1680 |
| Latitude | 45 deg 54.314 min N |
| Longitude | 77 deg 30.987 min W |
| Textual Plain-Language Description | "Company Picnic" |

FIG. 9

METHOD OF AUTOMATICALLY GEOTAGGING DATA

CROSS-REFERENCE TO RELATED APPLICATIONS

This is the first application filed for the present invention.

TECHNICAL FIELD

The present disclosure relates generally to handheld electronic devices equipped with Global Positioning System (GPS) receivers or other location-determining subsystems and, in particular, to geotagging techniques for such devices.

BACKGROUND

Some of the new generation of handheld electronic devices include both a camera and a Global Positioning System (GPS) receiver chipset. Examples of these handheld electronic devices include GPS-enabled wireless communications devices, PDA Pocket PCs or tablets, GPS-enabled camera-phones or smart phones, and GPS-enabled cameras. These devices can be made "location-aware" by virtue of a GPS receiver that is either embedded as a GPS chipset or connected externally, e.g. a Bluetooth™—enabled GPS puck.

The combination of GPS and camera features enables "geotagging" (or "geocoding") of digital photographs, i.e. tagging digital photos with geographical information indicative of the location at which the photo was taken. For example, the geotagging may involve appending coordinates of longitude and latitude to a metadata tag, e.g. an Exchangeable Image File Format (EXIF) tag, that is associated with the digital photo. Other forms of data (notes, blogs, audio clips, video clips, etc.) can also be geotagged in a similar fashion.

Once photos (or other data) are geotagged, the user can, at a later date, manually annotate the photos (or other data) with textual descriptions such as "Dad's 50$^{TH}$ birthday", "My trip to Hawaii 2007", etc. However, manually annotating (i.e. manually labelling) the photos (or other data) is time-consuming as this requires the user to retrieve the position coordinates from the metadata file associated with each geotagged photo (or other type of data set) and then use that set of coordinates (and possibly also the timestamp) to figure out where and in what context the photo was taken. Even with modern tools such as reverse geocoding, annotating a large batch of photos (or other sets of geotagged data) can be a very laborious process.

BRIEF DESCRIPTION OF THE DRAWINGS

Further features and advantages of the present technology will become apparent from the following detailed description, taken in combination with the appended drawings, in which:

FIG. 3 is a schematic depiction of a highly simplified database of geocoded street addresses in which geo-coordinates of latitude and longitude are stored in association with each street address or other point of interest, thereby enabling reverse geocoding of a given street address or point of interest to provide a plain-language description of the current location of the device at the time that the photo was taken (or, in the case of other types of data, at the time that the data was generated);

FIG. 8 is an example of a simplified EXIF tag used for geotagging digital photos, wherein the EXIF tag has an extra field for the textual plain-language description which, in this example, is derived from reverse geocoding using a lookup table or database such as the one presented by way of example in FIG. 3;

FIG. 9 is another example of a simplified EXIF tag used for geotagging digital photos, wherein the EXIF tag has an extra field for the textual plain-language description which, in this example, is derived from descriptive language contained in the subject field of the calendar entry depicted in FIG. 5.

It will be noted that throughout the appended drawings, like features are identified by like reference numerals.

DETAILED DESCRIPTION

Figure 1:
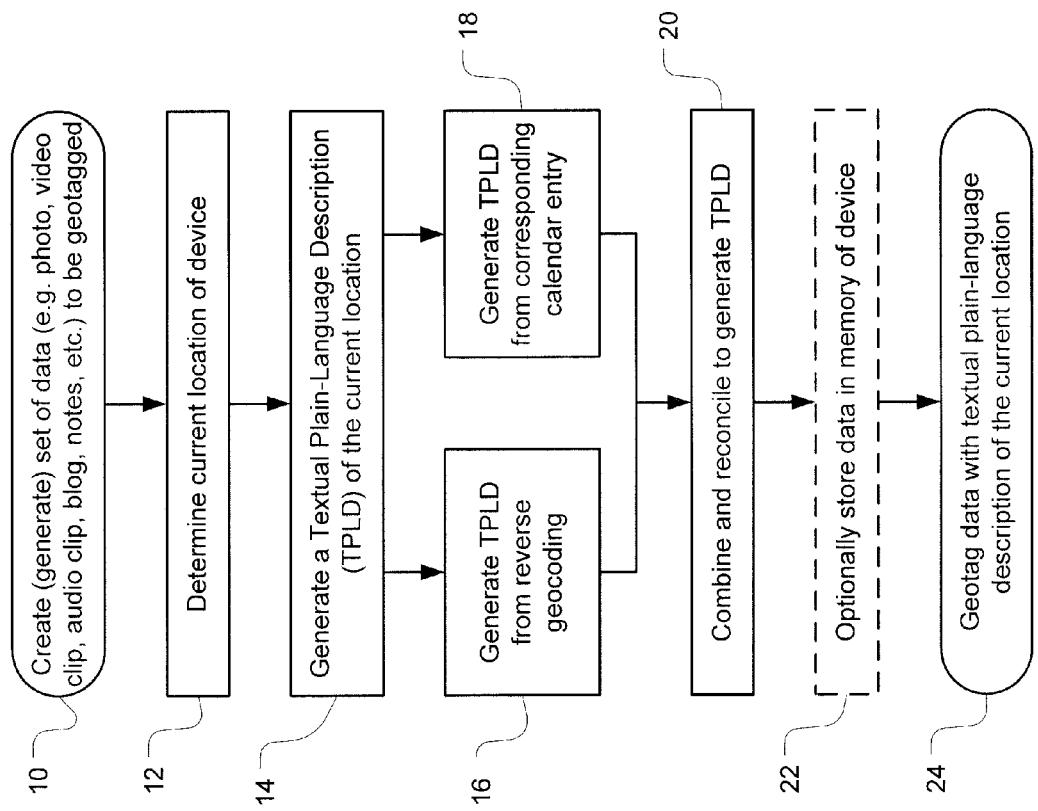
FIG. 1 is a flowchart outlining some of the main steps of a method of automatically geotagging data in accordance with implementations of the present technology.

The present technology provides, in general, a handheld electronic device, such as, for example, a GPS-enabled wireless communications device with an embedded camera, a GPS-enabled camera-phone or a GPS-enabled digital camera, that is configured to automatically geotag digital photos or other generated data (such as notes, a blog, an audio clip, video clip, etc.) with a textual plain-language description of the current location of the device at the time the photo was taken or other data generated. The textual plain-language description can be generated by reverse geocoding GPS position coordinates. Alternatively, the textual plain-language description can be generated by parsing and intelligently extracting descriptive language from a calendar entry that corresponds to the time at which the photo was taken (or other data generated). Using this innovative technology, the handheld electronic device can, for example, be configured to automatically write textual plain-language descriptions to the metadata tags of digital photos rather than simply geocoding the photos with numerical coordinates of latitude and longitude.

Thus, a main aspect of the present technology is a method of geotagging data using a handheld electronic device. The method includes steps of determining a current location of the handheld electronic device, generating a textual plain-language description of the current location, storing data in a memory of the device, and geotagging the data with the textual plain-language description of the current location.

In one implementation of this aspect of the technology, the generating of the textual plain-language description of the current location can be done by reverse geocoding the current location to determine a name of a geographical entity corresponding to the current location.

In another implementation of this aspect of the technology, the generating of the textual plain-language description of the current location can be done by correlating the current location with a calendar entry stored in a calendar application in the memory of the device.

In yet another implementation of this aspect of the technology, the current location of the handheld electronic device can be established by determining GPS coordinates of latitude and longitude using a GPS receiver to thus enable the handheld electronic device to generate the textual plain-language description of the current location either by one or both of (i) reverse geocoding the GPS coordinates to generate a place name corresponding to the GPS coordinates and (ii) extracting descriptive language from a calendar entry of a calendar application for a time corresponding to when the data to be geotagged is stored in the memory of the device.

Another main aspect of the present technology is a computer program product that includes code adapted to perform the steps of any of the foregoing methods when the computer program product is loaded into memory and executed on a processor of a wireless communications device.

Yet another main aspect of the present technology is a handheld electronic device having a location-determining subsystem for determining a current location of the handheld electronic device and a memory for storing data, the memory being operatively coupled to a processor that is configured to generate a textual plain-language description of the current location and to geotag the data with the textual plain-language description of the current location.

In one implementation of this aspect of the technology, the location-determining subsystem is a GPS receiver for generating GPS position coordinates, and wherein the processor is further configured to instruct a radiofrequency transmitter to transmit the GPS position coordinates to a geographical information server configured to determine a geographical description by reverse geocoding the GPS position coordinates, and then receive the geographical description from the geographical information server.

In another implementation of this aspect of the technology, the processor is further configured to determine descriptive language from a calendar entry of a calendar application for a time corresponding to when the data to be geotagged is stored in the memory of the device and then geotag the data with the descriptive language drawn from the calendar entry.

In yet another implementation of this aspect of the technology, the processor is further configured to determine descriptive language from a calendar entry of a calendar application for a time corresponding to when the data to be geotagged is stored in the memory of the device, reconcile the descriptive language with any geographical description obtained from reverse geocoding, and geotag the data with one or both of the descriptive language drawn from the calendar entry and the geographical description obtained from reverse geocoding.

The details and particulars of these aspects of the technology will now be described below, by way of example, with reference to the attached drawings.

FIG. 1 is a flowchart outlining some of the main steps of a method of automatically geotagging data such as, for example, digital photos using a handheld electronic device equipped with a location-determining subsystem such as, for example, a GPS receiver.

For the purposes of this specification, the expression "handheld electronic device" is meant to encompass a broad range of portable or mobile devices such as wireless communications devices, PDA Pocket PCs or tablets equipped with GPS, GPS-enabled camera-phones or smart phones, GPS-enabled cameras, etc. These devices can be made "location-aware" by virtue of a GPS receiver that is either embedded as a GPS chipset or connected externally, e.g. a Bluetooth™—enabled GPS puck.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

As depicted in FIG. 1, an initial step 10 of this method involves using a handheld electronic device to create (or generate) a set of data, be it by taking a digital photograph, by typing and saving some notes or a blog, by recording an audio clip or video clip, etc. As will be appreciated, virtually any type of data can be geotagged with information indicative of the geographical position ("current location") of the device at the time the data was generated.

Once the data to be geotagged has been generated, the current location of the device is determined (at step 12). This can be done either before the data is generated, while the data is being generated, or after the data has been generated. Determining the current location of the device at step 12 can be accomplished most expeditiously using a precise location-determining subsystem such as a Global Positioning System (GPS) receiver embedded or otherwise connected to the device. However, it should be understood that another type of location-determining subsystem can be used, even if it is less precise than GPS, including those location-determining subsystems that determine an approximate location of the device by radiolocation or triangulation techniques (e.g. angle of arrival (AOA), time difference of arrival (TDOA) location signature). Alternatively, an approximate location can be determined by identifying the closest base station or Wi-Fi access point, or combinations the foregoing techniques.

At step 14, as depicted in FIG. 1, the process of generating a textual plain-language description ("TPLD") of the current location is initiated. The TPLD can be generated by reverse geocoding (step 16) or (at step 18) by extracting descriptive language from a corresponding calendar entry (i.e. a calendar event corresponding to the same time of day). It should be understood that either step 16 or step 18 can be used or, alternatively, the method can include both steps (determining the TPLD from both reverse geocoding and calendar entries where available). Optionally, at step 20, in the case where both the textual plain-language description of the current location is generated based on both reverse geocoding and information stored in a calendar entry, then the information derived from steps 16 and 18 is combined and reconciled to generate a consistent and accurate plain-language description of the current location of the device.

Subsequently, at optional step 22, the data to be geotagged (e.g. the digital photo, notes, blog, audio clip, video clip, spreadsheet, drawing, etc.) can be stored in the memory of the device (or alternatively transmitted to a server or other remote storage device for storage of the created file). At step 24, the data is then geotagged with the textual plain-language description (TPLD) of the current location. Optionally, the geo-coordinates of latitude and longitude can also be included in the information written into the geotagged file. Geotagging can be done by writing the TPLD (and optionally also the geo-coordinates) into a metadata tag, e.g. an EXIF tag, associated with the digital photo or other data file.

Alternatively, instead of writing the TPLD to the metadata tag, such as an EXIF tag in the case of a digital photo, the device can create a separate geotag file that stores all the plain-language description and other optional geographical data such as geo-coordinates. If a separate geotag file is created, then an index or cross-reference can be used to correlate each set of TPLD data with each of the digital photos (or other data). In other words, a dedicated geotag file would store each digital photo file name (e.g. Picture0001.jpg) with the generated TPLD (e.g. "My House"). Optionally, the dedicated geotag could also store geo-coordinates as well (e.g. Lat=xx.xx.xx, Lon=xx.xx.xx). Alternatively, a separate file geo-coordinate filed could be used, also with an index or cross-reference so that it can be associated with the photo file to which it pertains.

Although the foregoing implementation has been described in terms of storing the geotagged data on a device, it should of course be appreciated that the device could simply be used to capture the data (e.g. take the photo), generate the TPLD, automatically geotag the data with the TPLD, and then wirelessly transmit the automatically geotagged data to a server or other computing device for storage.

In another implementation, the device could capture the data to be geotagged and simply capture the current location. The data to be geotagged and the current location could then be transmitted to a server or other computing device which could then perform the step of generating the textual plain-language description (TPLD) on behalf of the device (e.g. by reverse geocoding and/or by querying a calendar server or the handheld device itself). Once the TPLD has been generated and the data automatically geotagged with the plain-language description, the server or other computing device can store the geotagged data or transmit the geotagged to another computing device for storage (or it could even transmit the geotagged data back to the original handheld electronic device for storage in the device's local memory).

The foregoing method steps can be implemented as coded instructions in a computer program product. In other words, the computer program product is a computer-readable medium upon which software code is recorded to perform the foregoing steps when the computer program product is loaded into memory and executed on the microprocessor of the handheld electronic device.

As alluded to above, automatic geotagging of digital photos or other types of data can be accomplished by generating a textual plain-language description of the current location either by reverse geocoding and/or by extracting descriptive language from a calendar entry for a time contemporaneous with the generation of the data to be geotagged.

Although reverse geocoding and calendar data represent the main sources of descriptive language available to the handheld device, generation of appropriate textual plain-language description can also be done with reference to other sources of location and/or time information which can optionally be used as "default sources" of description where GPS or calendar events are uninformative or unavailable.

For example, photos taken (and time-stamped) on the morning of December 25$^{th}$ can be labelled (i.e. geotagged) as "Christmas Morning" or "Christmas Morning 2007" where no other description is available. If GPS data is also available, then both the holiday label "Christmas Morning" and the reverse geocoded position "Lake Tahoe, Nevada" can be added to the geotag.

Likewise, a timestamp or datestamp of a given photo can be correlated with birthdates and anniversaries stored in a list of contacts in an address book. For example, if an address book stores contact John Smith's birthday, a photo taken on that birthday can be labelled as "John Smith's Birthday" as a default. Default sources of TPLD can be configured by the user to be automatically written into the geotag or to be proposed to the user via a pop-up dialog box pop that prompts the user to confirm whether the proposed label/geotag would be appropriate.

For the purposes of this specification, "textual plain-language description" means a verbal description that uses plain words and phrases to describe the location, time or context in which a photograph was taken or in which some other set of data was generated. The textual plain-language description is thus a string of alphanumeric characters, with optional spaces, that forms meaningful words and phrases descriptive of the time, place or context in which a photo was taken or in which other data was generated. This technology geotags photos and other data with plain-language information that goes far beyond a merely numeric or coded timestamp, datestamp or set of geo-coordinates of latitude and longitude, which are generally quite meaningless to the reader. By automatically geotagging with a TPLD, an intelligible context or meaning is conveyed to the user, using actual words and/or phrases describing the place or event when the photo was taken or the data created. For the purposes of illustration, some examples of textual plain-language description (TPLD) include a civic address or street address e.g. "123 Main Street", a building name e.g. "Empire State Building", a district name e.g. "Tribeca", a park name e.g. "Central Park", city, state or province, country, continent, or even a type of terrain (e.g. mountain, island, river, waterfall, etc.) or a description that is personally meaningful to the user, e.g. "home", "work", "cottage", "mom and dad's place", etc. The TPLD may optionally include work or phrase separators such as, but not limited to conjunctions such as "AND", "AT", "NEAR", etc. to automatically construct phrases or more elaborate descriptions such as, for example, "Cottage at Mont-Tremblant" or "Waterfall near Quebec City".

TPLD Generated Based on Reverse Geocoding

Figure 2:
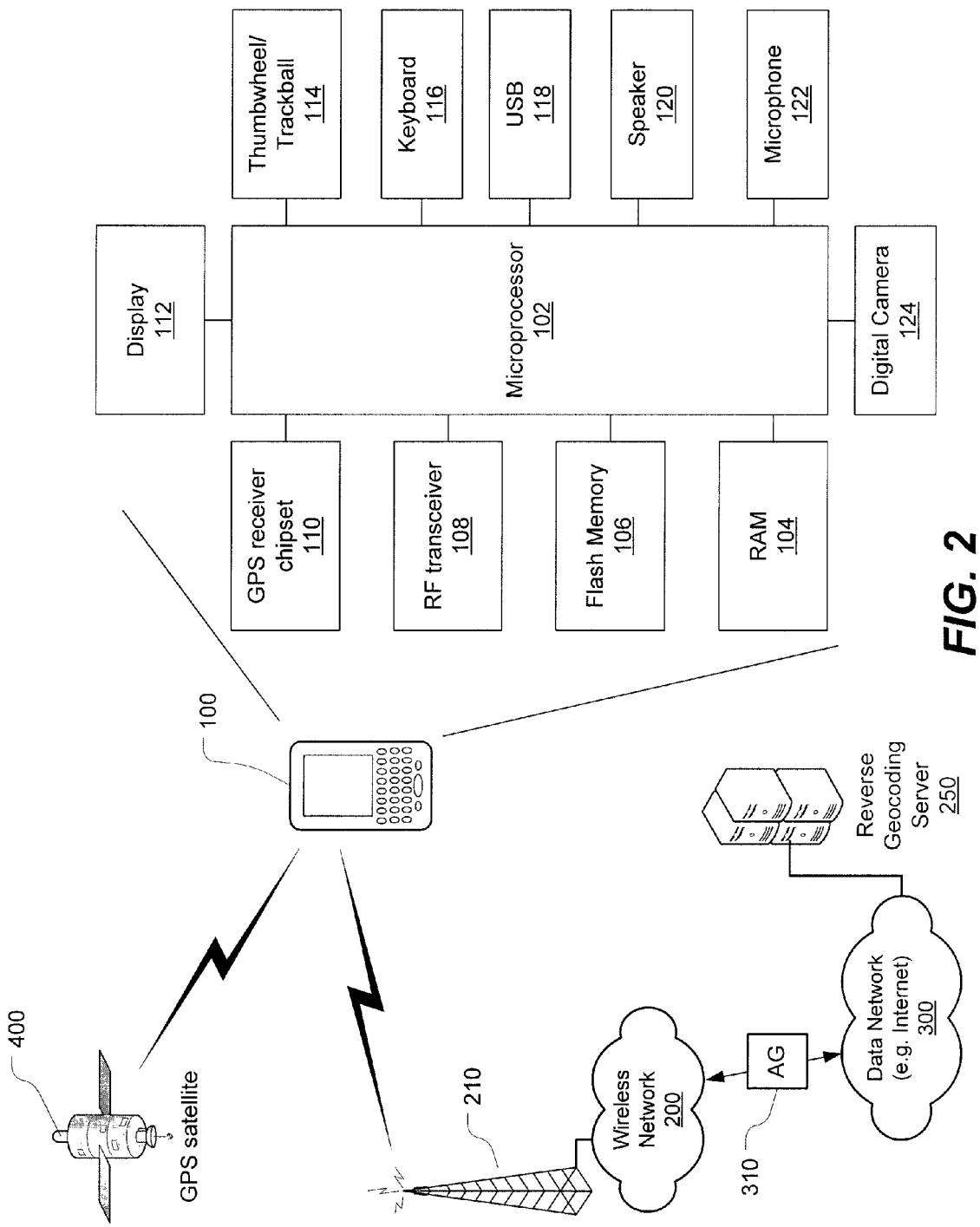
FIG. 2 is a schematic depiction of an exemplary network having a reverse geocoding server used to automatically geotag photos or other data using a GPS-enabled wireless communications device presented as one example of a handheld electronic device on which the present technology can be implemented.

FIG. 2 schematically depicts, by way of example, a GPS-enabled wireless communications device 100 that is presented as one example of a handheld electronic device on which the present technology can be implemented. The handheld electronic device, e.g. wireless communications device 100, includes a location-determining subsystem, e.g. GPS receiver chipset 110, for determining a current location of the handheld electronic device. The device 100 also includes a memory, e.g. RAM 104 and Flash Memory 106, for storing data, the memory being operatively coupled to a processor (e.g. microprocessor 102) that is configured to generate a textual plain-language description of the current location and to geotag the data with the textual plain-language description of the current location.

In the particular example depicted in FIG. 2, in which the handheld device 100 is a wireless communications device, the device may further include an radiofrequency (RF) transceiver 108, a display 112, an optional thumbwheel/trackball 114, an optional USB port 118, an optional speaker 120, and an optional microphone 122. The device 100 may also include a digital camera 124 for taking digital photos and optionally also digital video.

As depicted in the exemplary network shown in FIG. 2, the device 100 communicates over the air via a wireless network 200 having a base station 210. The wireless network is optionally connected to a data network 300 such as the Internet via an applications gateway 310 which performs various mappings and transformations on the data from the data network 300 in order to optimize it for wireless transport.

In this particular example depicted in FIG. 2, the device 100 can generate a textual plain-language description by reverse geocoding GPS coordinates obtained using the GPS receiver 110 based on signals received from GPS satellites 400. Reverse geocoding of the geo-coordinates of latitude and longitude, i.e. the GPS coordinates, can be done by transmitting these coordinates to a reverse geocoding server 250 connected to the data network 300. The reverse geocoding server 250 then performs a reverse lookup in a database such as the one shown simplistically in FIG. 3. Alternatively, the device 100 could be preloaded with a reverse geocoding database (such as the one shown in an intentionally simplified manner in FIG. 3) for locally performing the reverse lookup.

TPLD Generated Based on Calendar Events

The textual plain-language description can also be derived from calendar events or calendar entries (also known as datebook, diary or day-planner entries).

Figure 4:
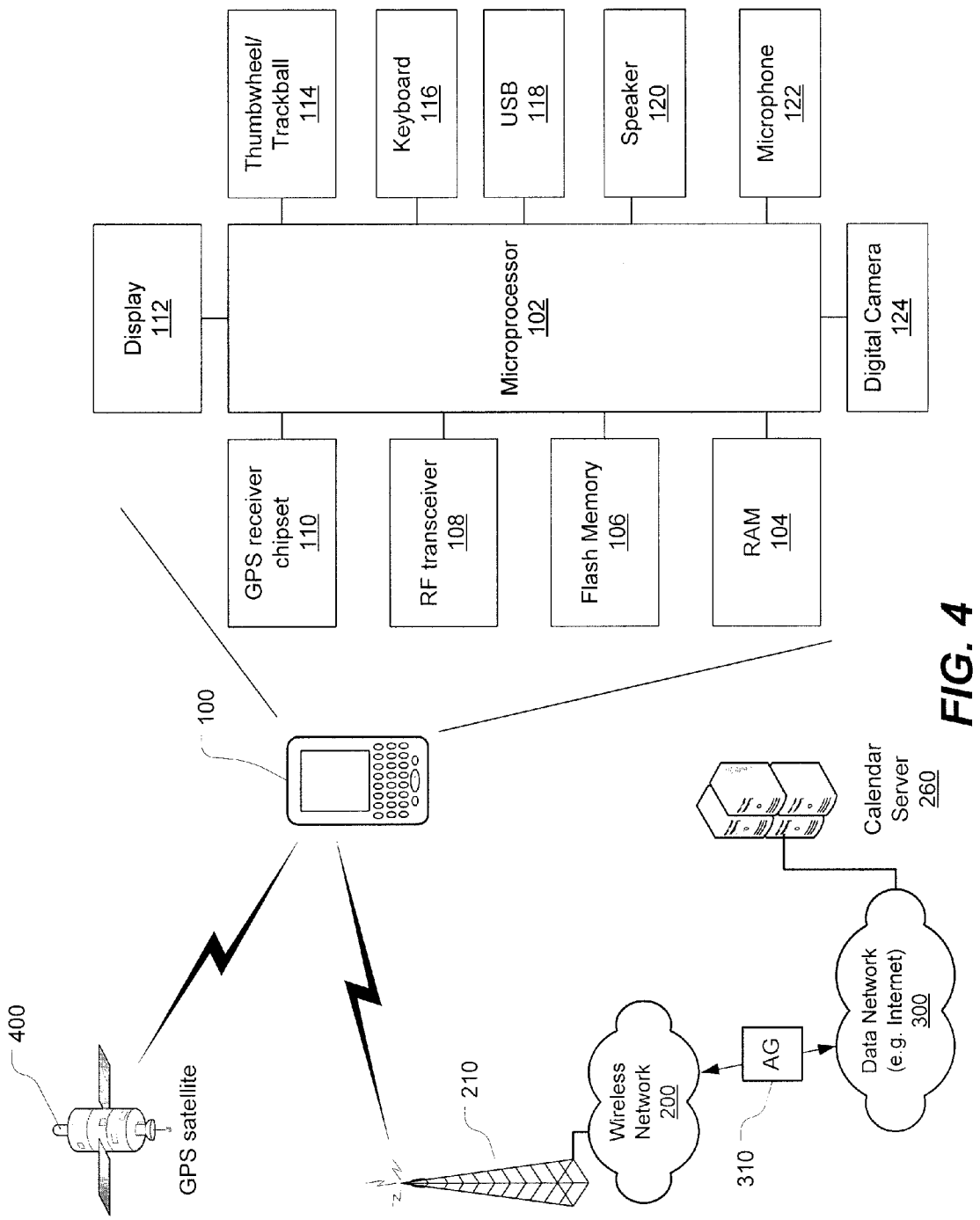
FIG. 4 is a schematic depiction of another exemplary network having a calendar server used to automatically geotag photos or other data using a GPS-enabled wireless communications device presented as one example of a handheld electronic device on which the present technology can be implemented.

FIG. 4 presents in schematic form a handheld device 100 operating in a network almost identical to that illustrated in FIG. 2 except for the presence of a calendar server 260 instead of the reverse geocoding server 250. The calendar server 260 (which may also be a bank of servers or a combined bank of mail and calendar servers) stores calendar events or entries which allow the device to synchronize with a desktop calendar client such as MS Outlook™ for example. In this particular example, the textual plain-language description (TPLD) can be generated by consulting the calendar entries stored either locally in the memory of the device 100 or on the calendar server 260. In either case, if there is a calendar entry corresponding to the current date and time (e.g. the datestamp and timestamp of the photo), then the calendar entry is parsed for descriptive language that may be extracted for use in generating the TPLD.

One parsing and extraction technique is to compare the words in the calendar entry against a predetermined list of keywords known to be descriptive or suggestive of the current location or the current circumstances. For example, the keyword list could include words or phrases such as "meeting at", "party at", "lunch with", "dinner with", "holiday in", "wedding", "picnic", "barbecue", "BBQ", "get-together", "birthday", "baptism", "first communion", "bar mitzvah", etc. This list could be customized by the user so he or she could add in other keywords. When one of these keywords is found, then those words (and any adjacent words) are extracted for generating the TPLD.

Figure 5:
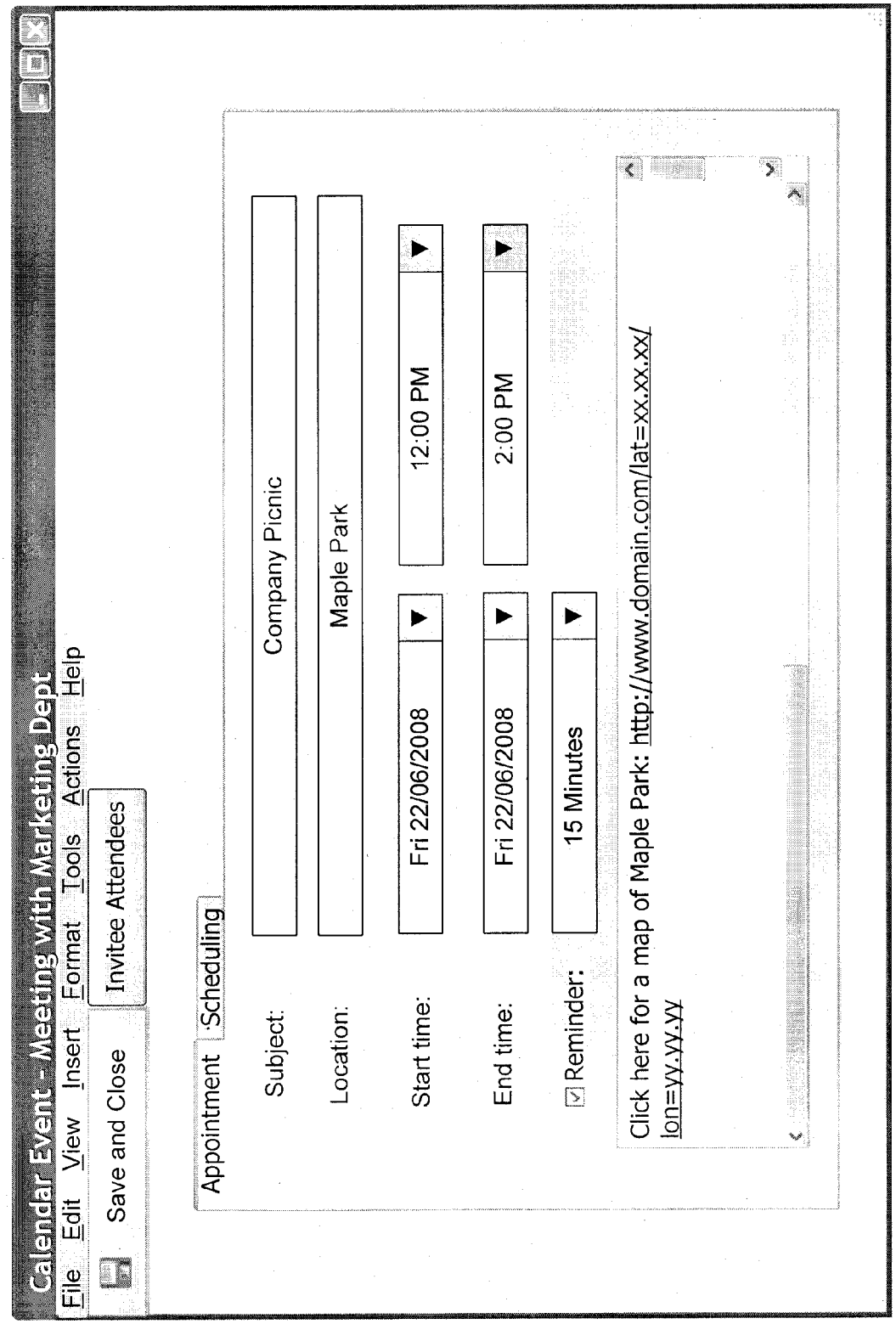
FIG. 5 is a depiction of an exemplary calendar event window that contains various pieces of descriptive language that can be parsed and intelligently extracted to describe the current location of the device at the time the photo was taken.

Another parsing and extraction technique is simply to extract descriptive language from certain fields of the calendar event window. Referring to the example calendar event window shown in FIG. 5, extraction of descriptive language could, for example, be confined to extracting descriptive language from the "Location" field only. The device could also be configured differently, so that information in the "Subject" field is also extracted. Likewise, information appearing in any particular field of the window could be used or ignored depending on the configuration of the device.

In addition to obtaining names, descriptive keywords or meaningful words or phrases from associated calendar appointments to generate the TPLD, the TPLD can also be generated by extracting keywords, names or descriptive phrases from other sources whose context may be useful in describing a photo, video, or other set of data. For example, the TPLD can be generated based on keywords extracted from (i) messages (e.g. e-mail, IM, SMS) that the device sends while at a specific location, (ii) status updates sent to IM or web-based social networking sites such as Facebook™, (iii) log entries or memos typed at a specific location, or (iv) any descriptions manually added by the user to one or more photos. As will be appreciated, the bulk of the text extracted from any of these sources will not be relevant; however, parsing this text (using, for example, one of the techniques described above) for informative and useful descriptive words or phrases will enable the device to automatically generate a textual plain-language description of the photo, video or other file.

In a specific variant, the parsing of calendar entries, messages, or other sources of descriptive language can be done by monitoring (i.e. "listening") for new words that are not currently contained within a dictionary associated with the particular application (calendar, e-mail, word-processor, etc.). In the case of a word-processing application, a dialog box might pop up to query the user as to whether the user wishes to add the new word to the dictionary. This feature can be exploited to identify potentially descriptive words or phrases for generating the TPLD. For example, if a user who is typing an e-mail message from a new location uses a new word that is hitherto unrecognizable to the dictionary associated with the e-mail application, then this new word should be flagged as a potentially relevant keyword for use in generating the TPLD.

As a specific example, consider a scenario in which a user visiting the Taj Mahal in India takes a number of photos and then composes an e-mail with the subject line "Greetings from the Taj Mahal" or otherwise uses the expression "Taj Mahal" in the body of the message. Presuming the expression "Taj Mahal" is not recognized by the dictionary associated with the e-mail application, this expression will be flagged as new. When attempting to automatically geotag the photos of the Taj Mahal, and assuming reverse geocoding does not yield an identification of the site, the device could then parse any other potential sources of description that were created in the same time frame and/or at the same approximate location. In this case, the device would parse the e-mail composed from the site. In parsing the e-mail, the expression "Taj Mahal" would be flagged as an expression unrecognizable to the dictionary and thus potentially relevant as a keyword or descriptive phrase for generating the TPLD.

In one implementation of this technology, the textual plain-language description can be intelligently reused to geotag other photos or data sets that were taken or generated at the same general time or in the same general location. This can be accomplished by determining if a subsequent set of data that is to be geotagged was generated in spatial or temporal proximity to a preceding set of data that has already been geotagged. If so, then the subsequent set of data is geotagged by reusing the textual plain-language description, or at least a relevant portion of the textual plain-language description. For example, if a user takes a series of photographs at a location that the wireless device determines is the Taj Mahal, then subsequent photos taken within a certain time frame and within a certain distance of that first photograph should presumptively be geotagged in the same manner.

Determining if a subsequent set of data was generated in spatial or temporal proximity to the preceding set of data can be done by determining a geographical displacement of the device between the location where the preceding set of data was generated and the current location where the subsequent set of data was generated and then comparing the geographical displacement to a predetermined distance threshold to assess whether any portions of the textual plain-language description of the current location can be reused. For example, if the predetermined distance threshold (which can be user-configurable) is set at 100 meters, then the device can reuse the TPLD established for the preceding photo or data set provided that the device has not been displaced by more than 100 meters from the location where the first geotagged photo was taken (or where the first geotagged data set was created).

In addition, the determination of whether TPLD is reusable can be based on time, i.e. by determining a time elapsed between a first time when the preceding set of data was generated and a second time when the subsequent set of data was generated. The time elapsed is then compared to a predetermined time threshold in order to assess whether any portions of the textual plain-language description of the current location can be reused. For example, if the predetermined time threshold (which can be user-configurable) is set at 1 minute, then any photograph taken within 1 minute of the initially tagged photograph can be tagged using the same TPLD.

The determination of whether the textual plain-language description is reusable for a subsequent photo or data set can thus be based on either the time elapsed, the geographical displacement or a combination of both. For example, the device could be configured to automatically reuse the TPLD of the preceding photo or data set provided that both the temporal and geographical conditions are satisfied, i.e. the time elapsed is less than the time threshold and the displacement is less than the distance threshold. Alternatively, the device can be configured to compare the displacement to the distance threshold first and to apply the time threshold only if the displacement cannot be determined (e.g. the device loses GPS lock).

TPLD Generated Based on Both Reverse Geocoding and Calendar

Although the textual plain-language description (TPLD) can be generated based on either reverse geocoding or calendar entries, it is also possible to use both sources of information and to reconcile the descriptions, particularly where there is a discrepancy.

Figure 6:
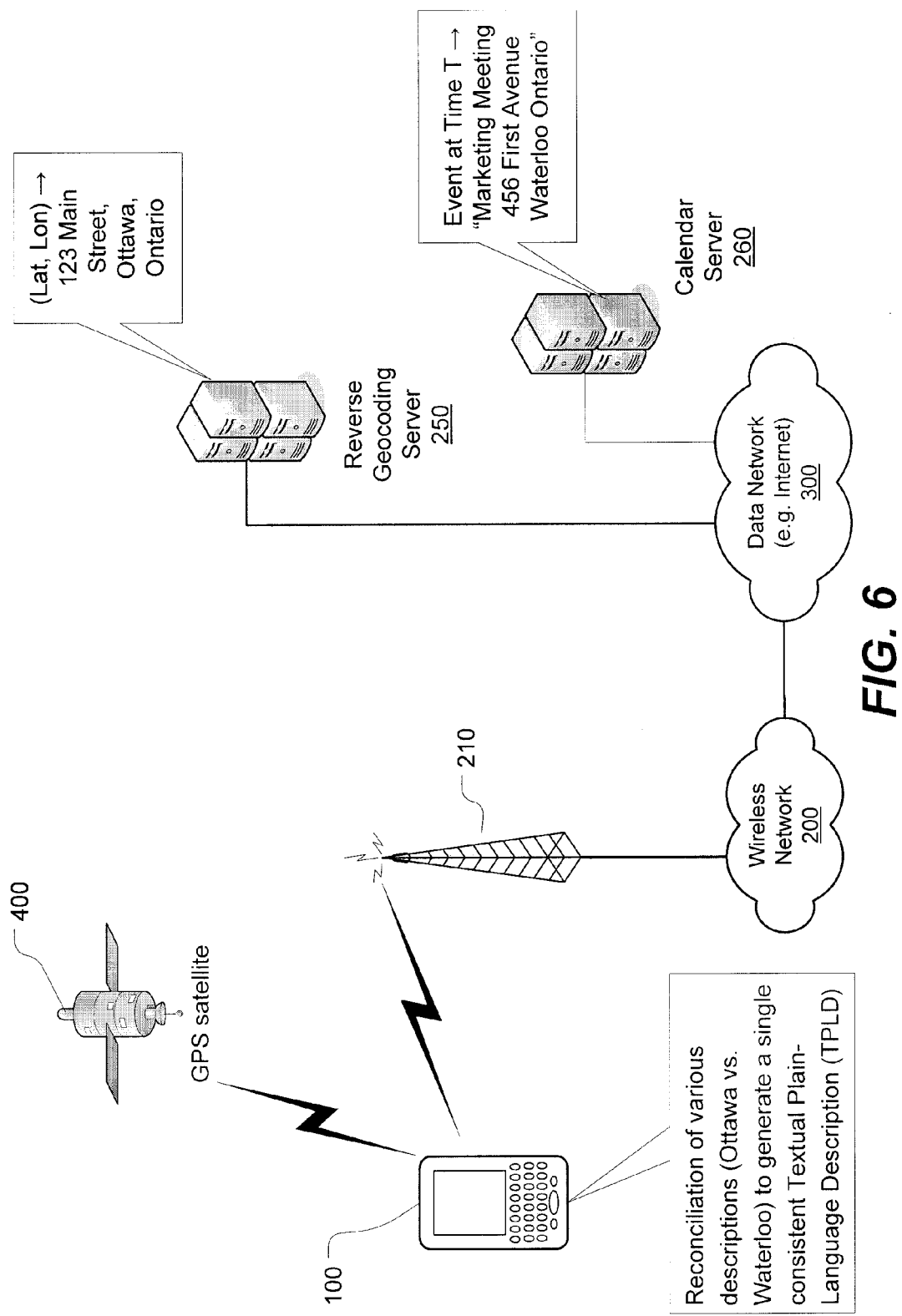
FIG. 6 is a schematic depiction of yet another exemplary network having both a reverse geocoding server and a calendar server used to automatically geotag photos or other data using a GPS-enabled wireless communications device presented as one example of a handheld electronic device on which the present technology can be implemented.

FIG. 6 depicts schematically a wireless communications device as an example of a handheld electronic device 100 that automatically geotags photos or other data by obtaining (or at least attempting to obtain) textual plain-language descriptions based on both reverse geocoding and calendar entries. In this particular example, just for the sake of illustration, let it be assumed that the device 100 uses its GPS receiver to acquire a GPS position fix based on signals received from the orbiting GPS satellites 400. The device 100 transmits its current location data (geo-coordinates) via base station 210, wireless network 200 and data network 300 to reverse geocoding server 250 and to calendar server 260. Again simply for the sake of illustrations let it be assumed that reverse geocoding server 250 returns a street address (e.g. "123 Main Street, Ottawa, Ontario") while calendar server 260 has a contemporaneous entry indicating a meeting due to occur at that same time (e.g. "Marketing Meeting—456 First Avenue, Waterloo, Ontario"). In this example, the device receives two conflicting addresses and should therefore attempt to reconcile the two addresses or attempt to select which one of the two inconsistent descriptions is more accurate. In this case, the GPS position fix would be more accurate (rather than a meeting event that the user may have, for example, chosen not to attend). In this example, the description "123 Main Street, Ottawa, Ontario" would be written to the geotag. Writing of the "123 Main Street . . . " address to the geotag could be done automatically or by first proposing this description to the user using a pop-up window or dialog box, thus enabling the user to accept or reject the proposed description.

Figure 7:
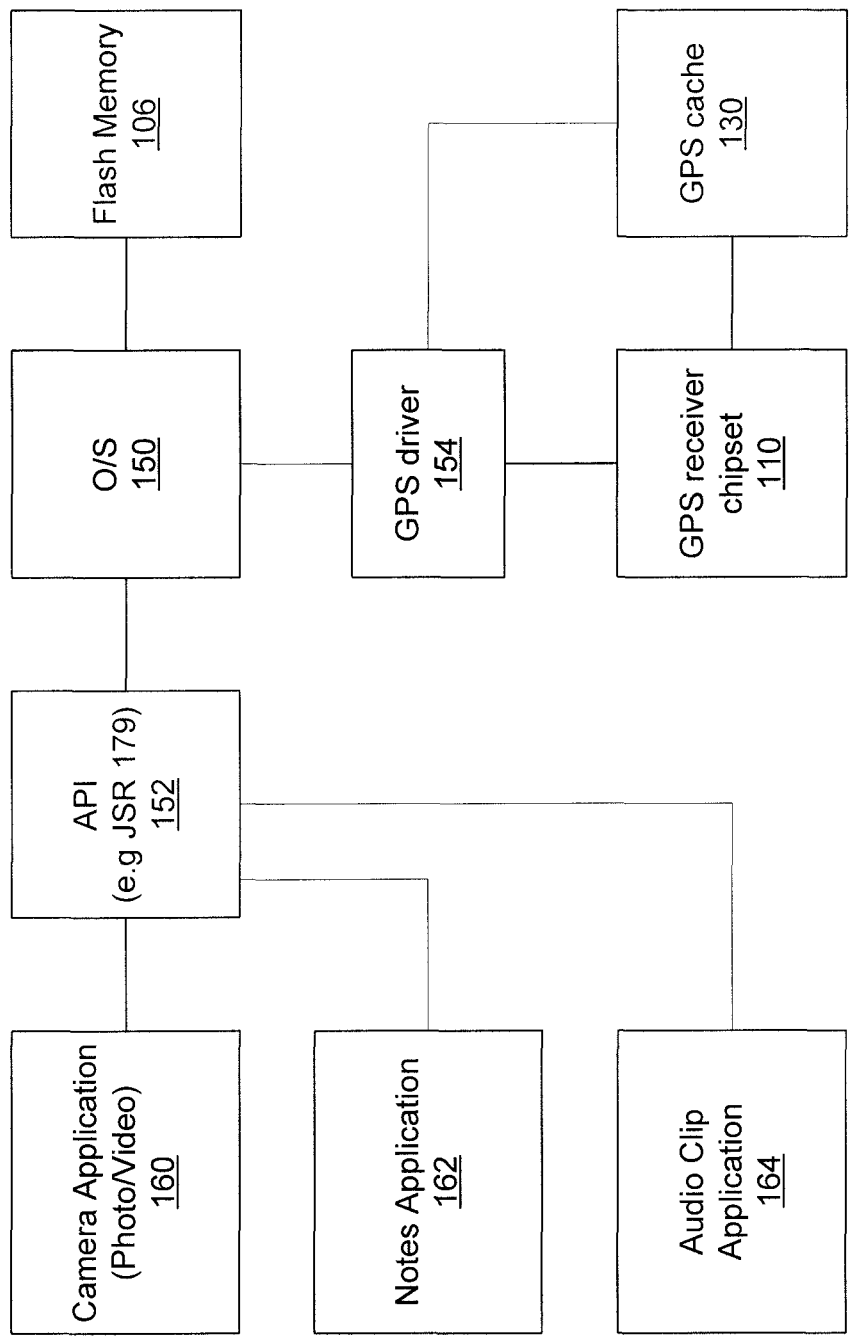
FIG. 7 is a block diagram depicting the interrelation amongst various software and hardware components on a GPS-enabled handheld device that are used to implement the present technology.

FIG. 7 depicts in a block diagram the interrelationship among various software and hardware components in one example implementation designed for geotagging data that is generated using, for example, one of three different applications on the device (e.g. camera application 160, notes application 162 and audio clip application 164, which are presented solely for the purposes of illustration. To geotag a digital photo, a set of notes or an audio clip, a request is communicate to API 152 (e.g. JSR 179) which then liaises with a GPS driver 154 via the operating system 150 for obtaining GPS position data. The operating system (O/S) 150 interacts with the GPS driver 154 for driving a GPS receiver chipset 110. A GPS cache 130 caches ephemeris data which is used by the GPS driver and GPS receiver chipset to obtain a position fix for the device based on the elapsed travel time for each of the received GPS signals (using trilateration techniques well known in the art). Launching the camera application 160, for example, would trigger a request into the API 152 (e.g. Java JSR 179) for GPS data. All location requests from the camera application 160 to the API 152 go to the GPS driver 154 via the OS 150, as shown in FIG. 7, which then communicates with the GPS chipset 110. The API is, in this example, Java JSR 179. JSR 179 ("Location API") is a specification defining a common API for retrieving location information on a variety of GPS-embedded mobile phones, PDAs, handhelds and other such devices. Once the GPS position data is obtained, the device generates, or causes to be generated (e.g. by a server), the textual plain-language description (TPLD) of the current location.

FIG. 8 and FIG. 9 are simplified examples of EXIF tags 500 that can be used to automatically geotag digital photographs using implementations of the present technology. As shown, the EXIF tags contain (as metadata) various pieces of information about the photograph itself as well as latitude data 502 and longitude data 504. In addition, the tags 500 contain textual plain-language descriptions (TPLDs) 506. As shown in FIG. 8, by way of example, the TPLD 506 in this case reads "123 Main Street, Ottawa, Ontario, Canada". In FIG. 9, the TPLD 506 reads "Company Picnic". There are merely provided by way of example to illustrate the sort of descriptive information that can be automatically written into the tag as metadata. In the examples shown in FIG. 8 and FIG. 9, the textual plain-language descriptions 506 are stored in addition to the latitude and longitude data 502, 504. It may, in certain circumstances (in particular where memory is limited) to omit the geo-coordinates 502, 504 (along with other "unimportant" fields) and simply to retain the TPLD 506.

Figure 10:
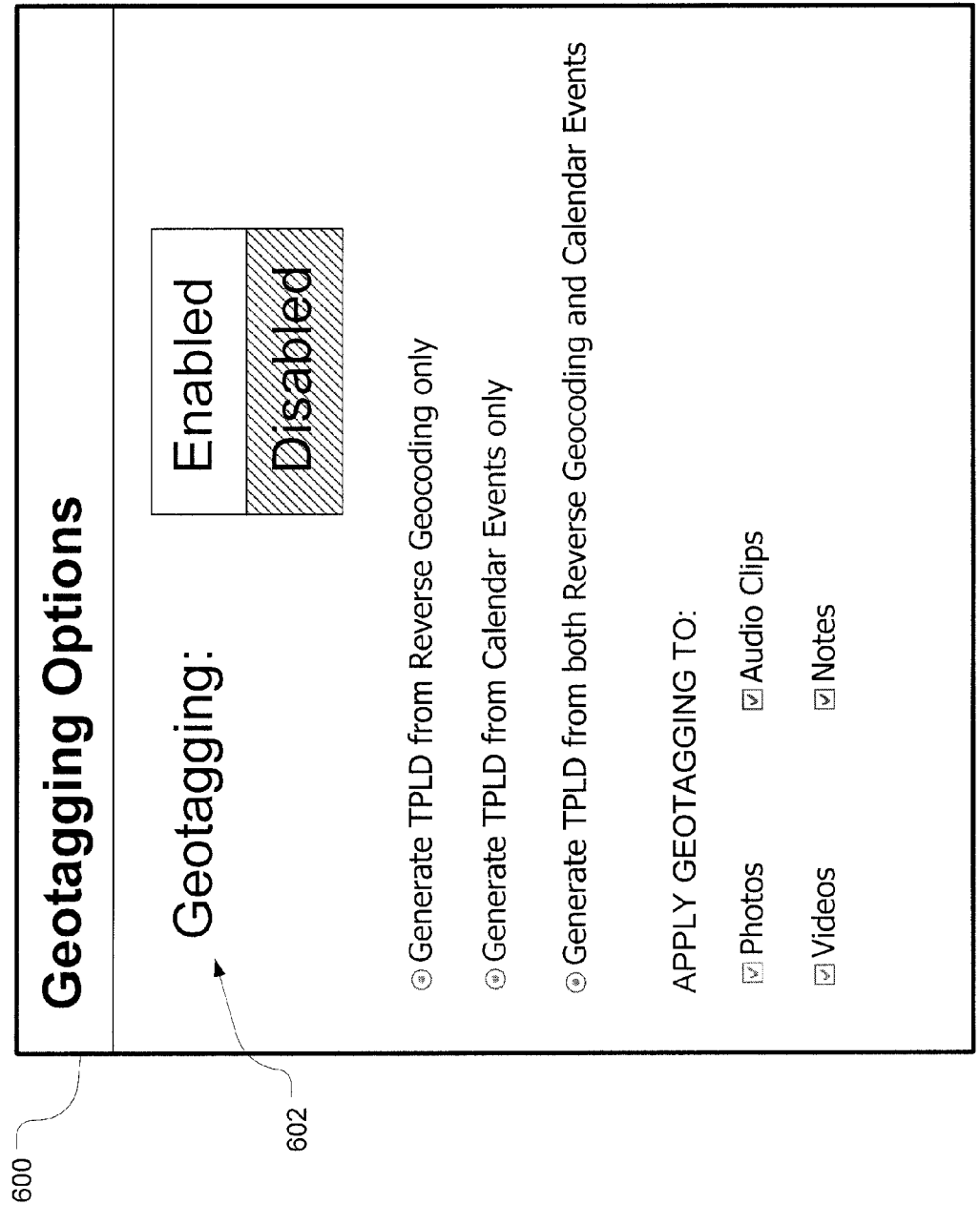
FIG. 10 is a schematic depiction of a geotagging options page that enables a user to configure various settings and preferences that govern the behaviour of the automatic geotagging functionality.

FIG. 10 is a geotagging options page 600 that enables the user to configure the geotagging behaviour by selecting various settings and preferences 602. As examples of configurable settings, automatic geotagging can be enabled or disabled, and the manner in which the TPLD is generated can be controlled (reverse geocoding, calendar entry parsing or both). Lastly, also by way of example, the application of geotagging can be controlled so that the device geotags only certain types of data, i.e. data generated by certain types of applications.

In another implementation of this technology, the textual plain-language descriptions can be indexed as searchable keywords to enable the user of the device to efficiently retrieve photos, videos, notes or other data that relate to a particular event, location, time, etc. A searchable index of textual plain-language descriptions can thus be drawn from a plurality of different sets of data (photos, video, audio clips, etc.) or, at the option of the user, confined to specific types of data (e.g. photos only).

For example, a user may wish to retrieve all photos, videos or notes that relate to his various trips to a particular destination. In that case, a keyword search of a TPLD index would identify all the photos, videos or other data that are described in terms of that particular destination. In other words, the textual plain-language description can be used as a keyword (or multiple keywords where the TPLD contains a phrase, for example) for searching other data files for data whose content is related to that of the geotagged data.

Although the use of a keyword index or "TPLD index" expedites the searching, the device could also be configured to search the metadata files directly or to search the specific TPLD fields thereof. Once a file is found, then the device could optionally also enable the user to search for related files. For example, a menu item (e.g. "Find related ...") could be provided to enable the user to find all related files.

The menu item could optionally provide advanced searching/finding features that would enable searching/finding by same location, same event, same city, same country, similar events, same time frame, etc., and combinations thereof. In one particular variant of this technology, the device could be configured to use its TPLD to add grouping information as well as keywords to Web-based file-sharing and/or blog-hosting services such as Flickr™ or Picasa™. For example, a user could use this technology to find other photographs that were taken on the same day by other people at the same company picnic, or to find other photographs taken by other tourists who have also visited the same specific location such as a particular monument or site. For example, this would enable a user to compare his photos with those taken by others who have posted similar photos on a Web-based photo-sharing service. As an alternative example, this would enable a user to find blogs or notes written and posted by others about a particular location he has photographed. As will be appreciated, there are many useful applications of this technology.

This new technology has been described in terms of specific implementations and configurations which are intended to be exemplary only. The scope of the exclusive right sought by the Applicant is therefore intended to be limited solely by the appended claims.

The invention claimed is:

1. A method of geotagging data using a handheld electronic device, the method comprising:
   generating data to be geotagged;
   determining a current location of the handheld electronic device;
   automatically generating a textual plain-language description of the current location, wherein generating the textual plain-language description comprises correlating the current location with a calendar entry stored in a calendar application in a memory of the device and extracting descriptive language from the calendar entry of the calendar application; and
   geotagging the data with the textual plain-language description of the current location; and
   determining if a subsequent set of data that is to be geotagged was generated in spatial or temporal proximity to the data that was previously geotagged; and
   geotagging the subsequent set of data by reusing at least a portion of the textual plain-language description.

2. The method as claimed in claim 1 wherein determining a current location of the handheld electronic device comprises determining Global Positioning System (GPS) coordinates of latitude and longitude.

3. The method as claimed in claim 1 wherein determining if a subsequent set of data was generated in spatial or temporal proximity to the data that was previously geotagged comprises:
   determining a geographical displacement of the device between the location where the data that was previously geotagged was generated and the current location where the subsequent set of data was generated;
   comparing the geographical displacement to a predetermined distance threshold to assess whether the textual plain-language description of the current location can be reused;
   determining a time elapsed between a first time when the data that was previously geotagged was generated and a second time when the subsequent set of data was generated; and
   comparing the time elapsed to a predetermined time threshold in order to assess whether the textual plain-language description of the current location can be reused.

4. The method as claimed in claim 1 further comprising creating a searchable index of textual plain-language descriptions drawn from a plurality of different sets of data.

5. The method as claimed in claim 1 wherein the textual plain-language description is usable as a keyword for searching other data files for data whose content is related to that of the geotagged data.

6. The method as claimed in claim 1, wherein extracting description language from the calendar entry of the calendar application comprises one or a combination of:
   comparing one or more words in the calendar entry against a predetermined list of keywords;
   extracting description language from one or more fields in the calendar entry; and
   monitoring for one or more words not contained in a dictionary associated with an application running on the device.

7. The method as claimed in claim 1, wherein the descriptive language extracted from the calendar entry of the calendar application is reconciled with a geographical description of the current location obtained from reverse geocoding the current location.

8. A non-transitory computer readable medium comprising code which when loaded into memory and executed on a processor of a handheld electronic device is adapted to automatically geotag data by:
   generating data to be geotagged;
   determining a current location of the handheld electronic device;
   automatically generating a textual plain-language description of the current location, wherein generating the textual plain-language description comprises correlating the current location with a calendar entry stored in a calendar application and extracting descriptive language from the calendar entry of the calendar application;
   geotagging the data with the textual plain-language description of the current location; and determining if a subsequent set of data that is to be geotagged was generated in spatial or temporal proximity to the data that was previously geotagged; and geotagging the subsequent set of data by reusing at least a portion of the textual plain-language description.

9. The computer readable medium as claimed in claim 8 wherein determining a current location of the handheld electronic device comprises determining Global Positioning System (GPS) coordinates of latitude and longitude.

10. The computer readable medium as claimed in claim 8 wherein determining if a subsequent set of data was generated in spatial or temporal proximity to the preceding set of data comprises:

determining a geographical displacement of the device between the location where the data that was previously geotagged was generated and the current location where the subsequent set of data was generated;

comparing the geographical displacement to a predetermined distance threshold to assess whether any portions of the textual plain-language description of the current location can be reused;

determining a time elapsed between a first time when the data that was previously geotagged was generated and a second time when the subsequent set of data was generated; and comparing the time elapsed to a predetermined time threshold in order to assess whether any portions of the textual plain-language description of the current location can be reused.

11. The computer readable medium as claimed in claim 8, wherein determining descriptive language from the calendar entry comprises one or a combination of:

comparing one or more words in the calendar entry against a predetermined list of keywords;

extracting description language from one or more fields in the calendar entry; and monitoring for one or more words not contained in a dictionary associated with an application running on the device.

12. A handheld electronic device comprising:

a location-determining subsystem for determining a current location of the handheld electronic device;

a memory for storing data, the memory being operatively coupled to a processor that is configured to automatically generate a textual plain-language description of the current location comprising correlating the current location with a calendar entry stored in a calendar application and extracting descriptive language from the calendar entry of the calendar application, and to geotag the data with the textual plain-language description of the current location, wherein the processor is further configured to determine if a subsequent set of data that is to be geotagged was generated in spatial or temporal proximity to the data that was previously geotagged and to geotag the subsequent set of data by reusing at least a portion of the textual plain-language description.

13. The handheld electronic device as claimed in claim 12 wherein the location-determining subsystem is a Global Positioning System (GPS) receiver for generating GPS coordinates.

14. The handheld electronic device as claimed in claim 12 further comprising a digital camera for taking a digital photo or video to be geotagged, wherein the processor is configured to:

automatically obtain the geographical description of the current location where the digital photo or video was taken; and geotag the digital photo or video by writing the geographical description into a metadata tag associated with the digital photo or video.

15. The computer readable medium as claimed in claim 8, wherein the descriptive language determined from the calendar entry of the calendar application is reconciled with a geographical description of the current location obtained from reverse geocoding the current location.

* * * * *